United States Patent [19]
Lonfils et al.

[11] Patent Number: 6,096,679
[45] Date of Patent: Aug. 1, 2000

[54] CATALYSTS FOR POLYETHYLENE PRODUCTION AND USE THEREOF

[75] Inventors: Nicodème Lonfils, Auderghem; Philippe Bodart, Clermont-sous-Huy; Guy Debras, Frasnes-les-Gosselies, all of Belgium

[73] Assignee: Fina Research, S.A., Feluy, Belgium

[21] Appl. No.: 09/161,254

[22] Filed: Sep. 26, 1998

[30] Foreign Application Priority Data

Sep. 27, 1997 [EP] European Pat. Off. ............... 97202970

[51] Int. Cl.⁷ .............................. B01J 21/04; B01J 21/08; B01J 23/26; B01J 31/34
[52] U.S. Cl. ................ 502/154; 502/152; 502/153; 502/171; 502/232; 502/305; 502/308; 502/309; 502/319; 502/320
[58] Field of Search ..................... 502/152, 153, 502/154, 171, 232, 305, 308, 309, 319, 320

[56] References Cited

U.S. PATENT DOCUMENTS

| 3,755,197 | 8/1973 | Hsieh ........................ 502/154 |
| 5,079,317 | 1/1992 | Tajima et al. .............. 526/106 |
| 5,723,399 | 3/1998 | Takemoto et al. ......... 502/113 |

FOREIGN PATENT DOCUMENTS

| 2340328 | 9/1977 | France . |
| 2671802 | 7/1992 | France . |
| 2086403 | 5/1982 | United Kingdom . |
| 9727225 | 7/1997 | WIPO . |

*Primary Examiner*—Elizabeth D. Wood
*Attorney, Agent, or Firm*—Jim Wheelington; M. Norwood Cheairs

[57] ABSTRACT

A process for producing a chromium-based catalyst for the production of polyethylene, the process comprising the steps of providing a catalyst support selected from silica, silica-titania and silica-zirconia; reacting the support with one of an aluminium alkyl compound or a chromium salt compound selected from at least one of chromium (III) acetylacetonate, chromium (III) acetate, chromium (III) oxalate and chromium (III) stearate; and thereafter reacting the support with the other of the aluminium alkyl compound or the chromium salt to produce a chromium-impregnated catalyst having a silica-alumina support, the catalyst composition comprising from 0.4 to 1.5 wt % chromium, based on the weight of the chromium-based catalyst and the alumina in the silica-containing support comprising from 0.5 to 4 wt % aluminium in the chromium-based catalyst.

6 Claims, 2 Drawing Sheets

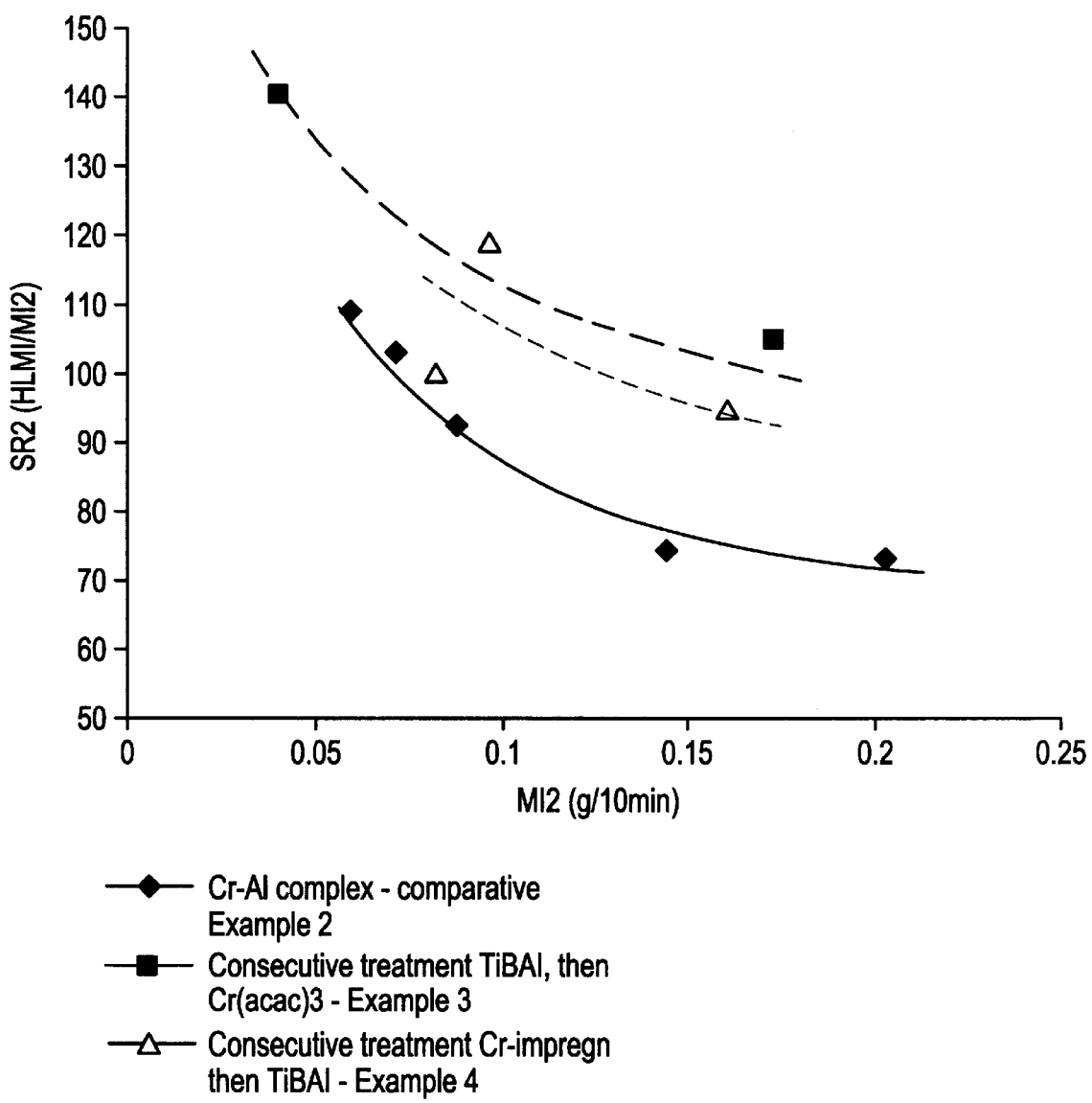

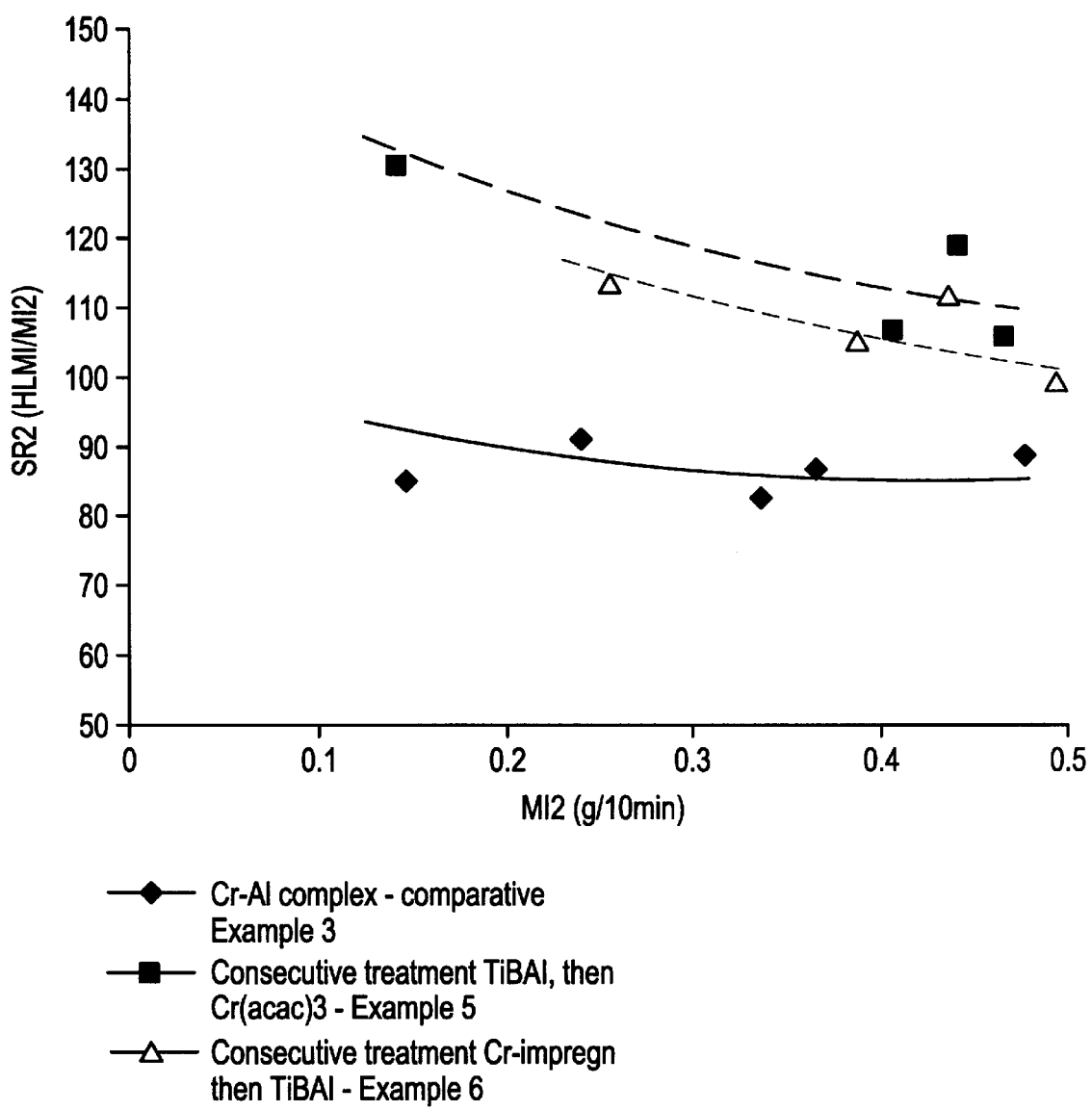

CATALYSTS FOR POLYETHYLENE PRODUCTION AND USE THEREOF

BACKGROUND TO THE INVENTION

The present invention relates to a process for the production of chromium-based catalysts for the production of polyethylene and to the use of such catalysts.

DESCRIPTION OF THE PRIOR ART

Polyethylene is well known for use in the manufacture of various articles. It is generally desirable for the polyethylene resin to have good processing properties whereby the polyethylene melt may readily be processed to form the appropriate article. In order to achieve such good processability of the polyethylene resins, it is desired that the flow properties and the shear response (SR) of the polyethylene are improved by broadening the molecular weight distribution of the polyethylene. A number of different catalyst systems have been disclosed for the manufacture of polyethylene, in particular high density polyethylene HDPE. It is known in the art that the physical properties, in particular the mechanical properties, of a polyethylene product vary depending on what catalytic system was employed to make the polyethylene. This is because different catalyst systems tend to yield different molecular weight distributions in the polyethylene produced. It is known to employ a chromium-based catalyst i.e. a catalyst known in the art as a "Phillips catalyst". Such a chromium-based catalyst enables the production of polyethylene having desirable physical and rheological properties.

There is a continuous incentive to develop new chromium-based Phillips catalysts for the production of polyethylene resins having improved mechanical or processing properties. Technical developments in the art have permitted a reduced consumption of polymer for the manufacture of individual final parts or products, for example the use of thinner walls for plastics bottles.

A large number of chromium-based catalysts are available for the production of HDPE, and also medium density polyethylene (MDPE), resins. For example, such catalysts include chromium deposited on various supports such as silica, silica-titania cogels, tergels, amorphous aluminium phosphate, alumina, Si—Al—P oxides, and silica-alumina supports such as cogels, coated silica or coprecipitated Cr—Al/silica supports.

EP-A-0072077 discloses the production of a chromium-based catalyst having a silica-alumina support. That specification discloses the deposition of a "Cr—Al complex" onto a silica carrier. The complex is obtained by reacting a Cr (III) compound, typically chromium acetylacetonate, with a tri-alkyl aluminium compound, typically triisobutyl aluminium (TIBAL), in an inert organic solvent and then impregnating a dry silica carrier with that complex.

Such a catalyst produced by that known process suffers from the disadvantage that shear response of the resultant polyethylenes produced using the catalyst in the polymerisation process could yet be improved. In addition, the catalyst produced in accordance with that prior specification does not have a particularly high activity with respect to the polymerisation of polyethylene.

SUMMARY OF THE INVENTION

It is an aim of the present invention to provide a process for producing a catalyst for use in the polymerisation of ethylene having improved rheological, and preferably also mechanical, properties. It is a further aim of the present invention to provide such a catalyst which has a good activity and also a good hydrogen response.

Accordingly, the present invention provides a process for producing a chromium-based catalyst for the production of polyethylene, the process comprising the steps of providing a catalyst support selected from silica, silica-titania and silica-zirconia; reacting the support with one of an aluminium alkyl compound or a chromium salt compound selected from at least one of chromium (III) acetylacetonate, chromium (III) acetate, chromium (III) oxalate and chromium (III) stearate; and thereafter reacting the support with the other of the aluminium alkyl compound or the chromium salt to produce a chromium-impregnated catalyst having a silica-alumina support, the catalyst composition comprising from 0.4 to 1.5 wt % chromium, based on the weight of the chromium-based catalyst and the alumina in the silica-containing support comprising from 0.5 to 4 wt % aluminium in the chromium-based catalyst.

In one embodiment of the process of the invention, the support is initially treated with the aluminium alkyl compound to form an alumina-containing silica support and thereafter the alumina-containing support is impregnated with chromium by treatment with the chromium salt.

In a second embodiment of the invention the support is treated with the chromium salt to impregnate chromium on the support and thereafter the chromium-impregnated support is treated with the aluminium alkyl compound thereby to incorporate alumina into the support.

The aluminium alkyl compound preferably comprises at least one of triisobutyl aluminium (TIBAL), triethyl aluminium (TEAL), tri-n-hexyl aluminum (TNHAL), tri-n-octyl aluminium (TNOAL) or methyl aluminium oxane (MAO). The aluminium alkyl compound is preferably deposited onto the support in the liquid phase and is present in an organic solvent.

Preferably, the support has a high surface area, typically greater than 400 $m^2/g$, and a high pore volume, typically at least 1.5 cc/g.

The present invention also provides the use of the catalysts produced in accordance with the invention for increasing the shear response of polyethylene resins.

The present invention is predicated on the surprising discovery by the inventors that by subjecting a silica-containing carrier with consecutive treatments, in either order, of (a) depositing alumina on the carrier and (b) impregnating the carrier with chromium, this can provide a catalyst yielding polyethylene resins having improved processability, as represented by the shear response (SR). The shear response of the polyethylene resins can be improved as compared to the known process for producing a chromium-based catalyst having a silica-alumina support as disclosed in EP-A-0072077. The increased shear response in the resultant polyethylene resins can, for any given melt index, yield improved processability of the resins and also improved mechanical properties.

Furthermore, the use of catalysts produced in accordance with the invention can provide that the polyethylene polymerisation process has an improved, i.e. higher, hydrogen response. In other words, the melt index, for example the melt index $MI_2$, of the polyethylene resins can readily be increased by increasing the hydrogen amount present in the polymerisation reactor.

BRIEF DESCRIPTION OF THE DRAWINGS

The present invention will now be described in detail with reference to the following non-limiting Examples and with reference to the accompanying drawings, in which:

FIG. 1 is a graph showing the relationship between the shear response and the melt index of resins produced in accordance with Examples 1 to 4 of the present invention and in accordance with Comparative Examples 1 and 2; and FIG. 2 is a further graph showing the relationship between the shear response and the melt index of polyethylene resins produced in accordance with Examples 5 and 6 of the present invention and in accordance with Comparative Example 3 wherein each catalyst was subjected to a titanation treatment prior to activation thereof.

DETAILED DESCRIPTION OF THE PREFERRED EMBODIMENTS

EXAMPLE 1

In this Example, a silica carrier for the resultant chromium-based catalyst was initially treated so as to deposit alumina thereon and thereafter the aluminated carrier was impregnated with chromium.

In the alumination step 120 g of silica were dried under nitrogen for 4 hours at 200° C. in a fluidised bed. The silica employed was a commercially available silica sold in commerce by the company Grace GmbH of Worms, Germany under Grade G5H. Thereafter, 100 g of the dried silica were introduced into a two liter glass reactor under a dry nitrogen blanket. The reactor was provided with a double jacket to allow cooling/heating thereof with water or oil. Then 850 ml of dry de-aerated hexane were poured into the reactor to form a silica slurry. Thereafter 30.29 g of a solution of triisobutyl aluminium (TIBAL) in a 50 wt % solution in hexane were added drop by drop, at room temperature, under stirring. The stirring was maintained for a period of 1 hour following complete TIBAL addition. The slurry was then allowed to settle for 30 minutes. The solution was then sucked off from the reactor using nitrogen gas overpressure and the residual solvent was removed by heating the reactor under vacuum. The reactor was then allowed to cool. All the operations up to this point were carried out under a nitrogen blanket to avoid any contact with air or moisture. The dried carrier was then treated with air and air injection was employed to avoid any temperature rise of the carrier above a temperature of around 100° C. The stabilised alumina-silica carrier had a yellow vanilla colour.

Following the alumination step, 100 g of the aluminated carrier were introduced into a 1000 ml bottle and the bottle and the silica-alumina carrier were subjected to a vacuum for 30 minutes. Then, 7 g of chromium (III) acetylacetonate (Cr(acac)$_3$) (97 wt % purity) were added to 400 ml of acetone. The thus-formed chromium-containing solution was added to the silica-alumina carrier drop by drop and then the bottle was shaken overnight. The acetone was then evaporated off in a rotavapour machine at a temperature of around 72° C. under a vacuum pressure of 400 mbars until a dry powder was obtained. The resultant catalyst was dried in an oven at a temperature of around 80° C. for one night. The final chromium-based catalyst had a blue colour.

EXAMPLE 2

In Example 2 a chromium-based catalyst having a support containing silica and alumina was produced by a process in which a silica carrier was initially subjected to a chromium-impregnation step following which the chromium-impregnated support was subjected to an alumination step, i.e. with a different order of steps of the chromium-impregnation and alumination than in Example 1.

In this Example, chromium is first deposited onto a silica support by impregnation by either an aqueous or an organic solution of a chromium compound followed by drying. The chromium compound comprised chromium (III) acetate. The support comprised a silica catalyst sold in commerce under the trade name HA30 by the company Grace GmbH of Worms, Germany. The resultant chromium-impregnated support contained 1 wt % Cr based on the weight of the chromium-impregnated support.

Thereafter, 120 g of the chromium-impregnated support were dried in a fluidised bed a temperature of 200° C. under nitrogen flow for 4 hours. Then 100 g of the dried catalyst were placed in a double-jacketed glass reactor under dry nitrogen and 800 ml of dried de-aerated hexane were introduced to form a slurry. Then 30.29 g of a 50 wt % solution of TIBAL in hexane were added drop by drop into the reactor at room temperature and under mechanical stirring. Stirring was carried on for a period of 1 hour after completion of the TIBAL addition. Stirring was then stopped and the mixture was allowed to settle for 30 minutes. The clear liquid solution was then sucked from the reactor and the residual solvent was then removed by heating the reactor under vacuum. The dried catalyst was then carefully stabilised by introducing air into the reactor. The air flow was established so as to avoid any temperature rise above 100° C. The final chromium-based catalyst containing a silica-alumina support was green in colour.

EXAMPLES 3 & 4

The catalysts produced in accordance with Examples 1 and 2 were evaluated for their performance in ethylene polymerisation to form polyethylene resins in bench scale polymerisation processes. Prior to use, the catalysts of Examples 1 and 2 were activated at a temperature of 650° C. in air and in a fluidised bed. The activity of each catalyst was controlled so as to have a productivity of around 1000 g PE/g catalyst.

The bench scale reactors had a volume of 4 liters. The required amount of activated catalyst was introduced into the reactor and then 2l of isobutane as a diluent were introduced into the reactor vessel. The reactor vessel was then heated to a polymerisation temperature of from 96 to 106° C. and an ethylene pressure was established so as to introduce around 6 wt % ethylene dissolved in isobutane into the polymerisation reactor. 1-hexene was injected into the system to provide a hexene concentration of from 0 wt % to around 0.5 wt % in isobutane.

The 1-hexene concentration and temperature were varied between different runs in the same Examples to provide polyethylenes of varying melt index $MI_2$. The melt index $MI_2$ is determined using the procedures of ASTM D1238 having a load of 2.16 kg at a temperature of 190° C. For each polyethylene resin, the high load melt index (HLMI) was also determined using the procedures of ASTM D1238 using a load of 21.6 kg at a temperature of 190° C. The shear response, which is a ratio between the HLMI and $MI_2$ values and is representative of the processability of the polyethylene resins, was then calculated.

FIG. 1 shows the relationship between the shear response SR and the melt index $MI_2$, for the polyethylene resins produced in accordance with Examples 3 and 4. Each Example comprised two or three runs producing polyethylene resins of different melt index by changing the polymerisation temperature and/or the 1-hexene concentration in the polymerisation reactor vessel. It may be seen from FIG. 1 that for any given value of the melt index $MI_2$, the resins produced in accordance with Example 3, using the catalyst produced in accordance with Example 1, tend to have a higher shear response SR than the resins produced in accordance with Example 4, using the catalyst of Example 2. This indicates that the resins produced in accordance with Example 3 tend to have an improved processability as compared to the resins produced in accordance with Example 4.

COMPARATIVE EXAMPLE 1

In accordance with Comparative Example 1 a chromium-based catalyst having a silica-alumina support was produced in accordance with the prior art method generally disclosed in EP-A-0072077. In that process, a "Cr—Al complex" was prepared which was then impregnated onto a silica carrier, as opposed to the successive chromium-impregnation/alumination or alumination/chromium-impregnation steps employed in accordance with the methods of the embodiments of the present invention.

In Comparative Example 1, a "Cr—Al complex" of chromium (III) acetylacetonate and triisobutyl aluminium (TIBAL) was synthesised, with the synthesis steps being carried out under a nitrogen blanket to avoid any contact with moisture or air. Initially, 7.13 g of chromium (III) acetylacetonate $(Cr(acac)_3)$ (97 wt % purity) were added into 100 ml of dry de-aerated hexane to form a slurry mixture in a double-jacketed reactor. The mixture was then heated under stirring until the boiling point of the mixture and then the mixture was refluxed at a temperature of around 70 to 80° C. in the double-jacketed reactor. After reflux, 30.29 g of TIBAL as a 50% a solution comprising 15.145 g of pure TIBAL and 15.145 g of dried de-aerated hexane were added drop by drop to the refluxed mixture containing chromium (III) acetylacetonate. An exothermal reaction then occurred and the system was refluxed for a further period of 1 hour. A solution of a dark brown complex was obtained. The solution was transferred, under nitrogen gas, into a 250 ml glass bottle and the mixture was then filtered under nitrogen to remove any insoluble compound. The resultant solution was kept under nitrogen.

In the following silica-impregnation step, 120 g of silica available in commerce from the company Grace GmbH of Worms, Germany under Grade G5H were dried in a fluidised bed under a flow of nitrogen for a period of 4 hours at a temperature of around 200° C. Then, 100 g of the dried silica were introduced into a 2l reactor under nitrogen and 850 ml of hexane were added to form a slurry. The previously formed complex of $Cr(acac)_3$-TIBAL was added drop by drop, at room temperature, under mechanical stirring and the stirring was continued for a period of 1 hour after the complete addition of the complex. The hexane solution became clear whereas the silica turned dark brown.

The catalyst was then dried and stabilised by the following steps. Stirring was interrupted and the mixture was allowed to settle for a period of 30 minutes. The clear solution was transferred to another glass flask using nitrogen overpressure and the remaining solvent was evaporated by heating at a temperature of around 70° C. under vacuum in a vacuum flask. Any gas admitted into the system comprised nitrogen gas. The dried catalyst was stabilised by admitting a small flow of dry air into the reactor and the air flow was adjusted so as to keep the temperature below 100° C.

The thus-obtained unactivated catalyst had a green colour. The target composition of the catalyst was 1 wt % Cr and 2 wt % Al, each based on the weight of the chromium-based catalyst.

COMPARATIVE EXAMPLE 2

The catalyst formed in accordance with Comparative Example 1 was employed in a bench scale polymerisation process similar to the process described with reference to Examples 3 and 4. The polymerisation conditions, in particular the 1-hexene concentration and polymerisation temperature, were varied to yield polyethylene resins having differing melt indexes $MI_2$ in five runs. For each polyethylene resin so produced, the melt index $MI_2$ and the shear response SR were determined. The results are also shown in FIG. 1.

It may be seen that for Comparative Example 2, for any given melt index $MI_2$ the shear response SR significantly lower for the resins produced thereby as compared to the resins produced in accordance with Examples 3 and 4. This demonstrates that the catalysts prepared in accordance with the invention using consecutive chromium-impregnation/alumination steps in either order can yield polyethylene resins having improved shear response as compared to the resins produced using the catalyst known from EP-A-0072077. The resultant polyethylene resins formed in accordance with the present invention thus exhibit improved processability and also mechanical properties, as compared to the resins produced using the known catalyst.

The catalysts produced in accordance with the invention also have been found to exhibit a higher activity as compared to the catalyst produced in accordance with Comparative Example 1. If the catalyst produced in accordance with Comparative Example 1 is determined to have a relative activity of 100, the catalysts produced in accordance with the Examples 1 and 2 have relative activities of 120 and 150 respectively.

EXAMPLES 5 & 6

Examples 3 and 4 were repeated with the additional step, prior to the catalyst activation step, of titanating the catalysts of Examples 3 and 4 with titanium triisopropoxide at a temperature of around 300° C. to yield a target titanium content of around 4 wt % based on the weight of the catalyst.

Again, the resultant resins for each Example having varying melt index $MI_2$ were tested so as to measure the melt index and to determine the shear response for each resin. The results are shown in FIG. 2. Four runs were performed for each Example.

FIG. 2 shows that for Examples 5 and 6, the shear response/melt index relationship is such that for Example 5 the shear response is generally higher for any given value of $MI_2$ as compared to the resins produced in accordance with Example 6.

COMPARATIVE EXAMPLE 3

In Comparative Example 3 the catalyst produced in accordance with Comparative Example 1 was subjected to the bench scale polymerisation process described with reference to Comparative Example 2 but additionally employing a titanation step as described with reference to Examples 5 and 6 prior to activation of the catalyst. The polyethylene resins produced in accordance with Comparative Example 3 had varying melt index $MI_2$ and again the relationship between the shear response and the melt index is shown in FIG. 2. Five runs were performed for Comparative Example 3.

It may be seen from FIG. 2 that for any given melt index $MI_2$ value for the polyethylene resins produced in Comparative Example 3, the shear response is significantly lower than for the resins produced in accordance with Examples 5 and 6 having similar melt indexes $MI_2$. This demonstrates that the use in a polyethylene polymerisation process of the catalysts produced in accordance with the present invention can provide resins having improved processability as represented by the shear response, particularly when the alumination of the catalyst is carried out prior to the chromium-impregnation. Furthermore, it was found that the activity of the catalyst produced in accordance with Examples 5 and 6 was around 30 to 70% higher than the catalyst produced in accordance with Comparative Example 3.

EXAMPLES 7 & 8

The polymerisation processes of Examples 3 and 4 were repeated but instead of introducing hexene as a copolymer into the polymerisation reactor, polyethylene homopolymers were produced and up to 10 Nl of hydrogen gas were introduced into the reactor. The polymerisation conditions for various runs, including the polymerisation temperature and the amount of hydrogen, are shown in Table 1, for Examples 7 and 8, together with the measured values for the melt index $MI_2$ and the shear response SR for the resultant polyethylene resins.

TABLE 1

| | Polymerisation Temperature (0° C.) | $H_2$ (Nl) | $MI_2$ (g/10 min) | SR |
|---|---|---|---|---|
| Example 7 | 102 | 0 | 0.039 | 141 |
| | 106 | 0 | 0.173 | 106 |
| | 102 | 10 | 0.30 | 76 |
| Example 8 | 104 | 0 | 0.082 | 101 |
| | 106 | 0 | 0.16 | 96 |
| | 102 | 10 | 0.17 | 82 |
| Comparative | 102 | 0 | 0.059 | 110 |
| Example 4 | 104 | 0 | 0.088 | 93 |
| | 102 | 10 | 0.13 | 88 |
| | 104 | 10 | 0.17 | 78 |

The hydrogen response of a catalyst for polymerising polyethylene represents the ability of hydrogen gas to increase the melt index, for example the melt index $MI_2$, of the resultant polyethylene resin at any given polymerisation temperature for a given concentration of hydrogen in the polymerisation process. As a general rule, as the amount of hydrogen employed in the polymerisation reactor increases, the melt index $MI_2$ of the subsequent polyethylene resin tends to increase, for any given polymerisation temperature. It may be seen from Table 1 that for Example 7, the melt index of the resultant polyethylene resin produced using a hydrogen introduction and at a polymerisation temperature of 102° C. is higher than the corresponding melt index of Example 8 also having a similar hydrogen introduction and polymerisation temperature. Thus the catalyst produced in accordance with Example 7 has a higher hydrogen response than that produced in accordance with Example 8.

When comparing Examples 7 and 8 it may be seen that for a given melt index and polymerisation temperature the polyethylene resins produced in accordance with Example 7 tend to have a higher shear response SR than those of Example 8. This is an indication that the use of a catalyst having an alumination treatment by TIBAL with subsequent chromium-impregnation, produces resins having improved processability as compared to resins polymerised using a catalyst which was prepared using a consecutive treatment of chromium-impregnation and then alumination by TIBAL.

COMPARATIVE EXAMPLE 4

Comparative Example 4 repeated the experiments of Examples 7 and 8 by using as the catalyst the catalyst produced in accordance with Comparative Example 1. The polymerisation conditions of various runs of Comparative Example 4, together with the properties of the resultant polyethylene resins, are also shown in Table 1.

It may be seen from Table 1 that for any given polymerisation temperature, in the absence of hydrogen the shear response obtained using the catalysts of the invention is higher than for the catalyst of the prior art as represented by Comparative Example 4. This shows that the catalysts of the present invention can provide polyethylene resins having improved processability. In addition, for the run having a polymerisation temperature of 102° C. and a hydrogen addition of 10 Nl, the melt index $MI_2$ of Comparative Example 4 is lower than the corresponding values for Examples 7 and 8. This indicates that the hydrogen response for catalysts produced in accordance with the invention is higher than that for the known catalyst.

In summary, the use of the catalysts produced in accordance with the invention can enable the production of polyethylene resins having higher shear response, and thus improved processability, and mechanical properties, compared to polyethylene resins produced using known catalysts prepared by the impregnation of a "Cr—Al complex" onto a silica-containing support. In addition, the catalysts of the present invention can enable a higher hydrogen response to be achieved, together with higher catalyst activity The use of a titanation treatment in the activation procedure also yields higher shear response for the resultant polyethylene resins and higher catalytic activity than for the known catalyst.

What is claimed is:

1. A process for producing a chromium-based catalyst for the production of polyethylene, the process comprising the steps of providing a catalyst support selected from silica, silica-titania and silica-zirconia; reacting the support with one of an aluminium alkyl compound or a chromium salt compound selected from at least one of chromium (III) acetylacetonate, chromium (III) acetate, chromium (III) oxalate and chromium (III) stearate; and thereafter reacting the support with the other of the aluminium alkyl compound or the chromium salt to produce a chromium-impregnated catalyst having a silica-alumina support, the catalyst composition comprising from 0.4 to 1.5 wt % chromium, based on the weight of the chromium-based catalyst and the alumina in the silica-containing support comprising from 0.5 to 4 wt % aluminium in the chromium-based catalyst.

2. A process according to claim 1 wherein the support is initially treated with the aluminium alkyl compound to form an alumina-containing silica support and thereafter the alumina-containing support is impregnated with chromium by treatment with the chromium salt.

3. A process according to claim 1 wherein the support is treated with the chromium salt to impregnate chromium on the support and thereafter the chromium-impregnated support is treated with the aluminium alkyl compound thereby to incorporate alumina into the support.

4. A process according to claim 1 wherein the aluminium alkyl compound is selected from at least one of triisobutyl aluminium (TIBAL), triethyl aluminium (TEAL), tri-n-hexyl aluminum (TNHAL), tri-n-octyl aluminium (TNOAL) and methyl aluminium oxane (MAO).

5. A process according to claim 1 wherein the aluminium alkyl compound is deposited onto the support in the liquid phase and is present in an organic solvent.

6. A process according to claim 1 wherein the support has a surface area of greater than 400 $m^2/g$, and a pore volume of at least 1.5 cc/g.

* * * * *